(No Model.)
A. F. PUREFOY.
BOX SIEVE.
No. 376,450. Patented Jan. 17, 1888.
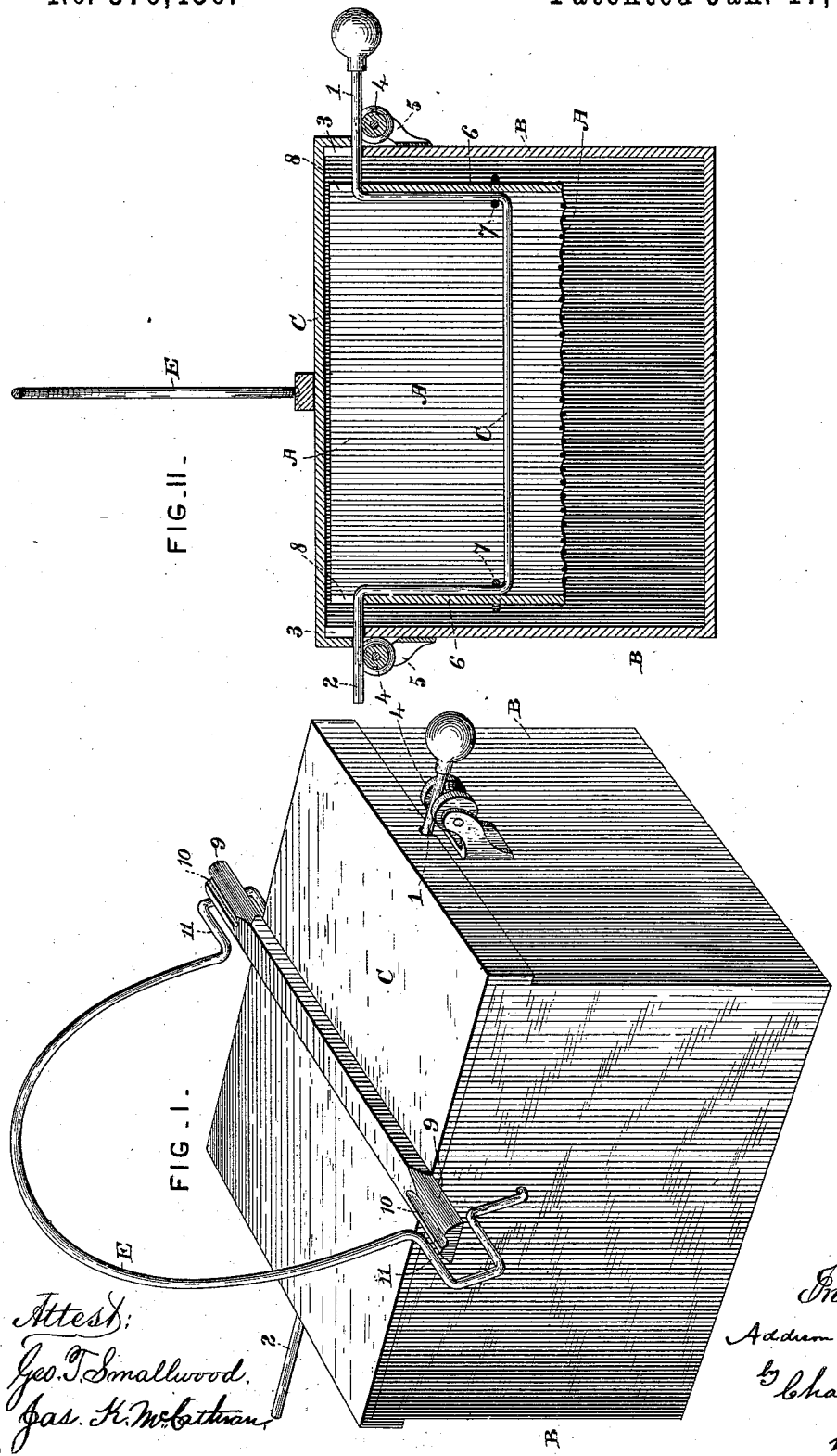
Attest:
Geo. T. Smallwood.
Jas. K. McCathran.
Inventor
Addum F. Purefoy
by Chas. J. Hedrick
his attorney
N. PETERS. Photo-Lithographer. Washington. D. C.

UNITED STATES PATENT OFFICE.

ADDISON F. PUREFOY, OF NEW HAVEN, CONNECTICUT.

BOX-SIEVE.

SPECIFICATION forming part of Letters Patent No. 376,450, dated January 17, 1888.

Application filed March 28, 1887. Serial No. 232,684. (No model.)

*To all whom it may concern:*

Be it known that I, ADDISON F. PUREFOY, a citizen of the United States, residing at New Haven, in the county of New Haven and State of Connecticut, have invented certain new and useful Improvements in Box-Sieves, of which the following specification is a full, clear, and exact description.

This invention relates more particularly to the sifters or sieves for sifting ashes and other materials, which are designed for household purposes, and which have a covered box or frame and a reciprocating sieve supported in said frame above the bottom thereof.

The several features constituting the invention, as well as the best mode to me known of practically applying the principle thereof, can most conveniently be explained with the aid of the accompanying drawings, which form part of this specification.

Figure I is a perspective view of a sifter constructed in accordance with the invention, and Fig. II a vertical section on line I I of Fig. I.

The sieve A is provided at the ends with supports 1 and 2, which project through notches or open-ended slots 3 at the top of the box B. The sieve is preferably about the same width as the box, but is somewhat shorter than the same, so that it can be reciprocated or shaken therein, and the supports 1 and 2 are of sufficient length to permit this to be done. The support 1 terminates in a handle for taking hold of for shaking. This mode of supporting the sieve in the box or frame is not only very simple, but it also has the advantage of permitting the sieve readily to be removed from the box B, in order to empty the sieve or the box, or both. No drawer therefor, or opening in the bottom of the sieve-box, is necessary for the discharge of the sifted material, although one could be used, but it is not desirable. The projecting supports are very convenient to lift the sieve out by.

In order to enable the sieve to be shaken with more ease, the supports 1 and 2 are each made to rest upon a roller, and specially a grooved roller, 4, mounted on a bracket, 5, on the outside of the box. This arrangement of supporting-rollers outside of the sieve-box may be employed, whether the sieve is or is not removable, by having the supports 1 and 2 in notches. It removes the rollers from the liability of clogging up with dust or ashes.

In order to secure greater economy and simplicity with a sufficient degree of strength, the supports 1 and 2 are formed by the ends of a suitably heavy wire, C, which in the middle is bent down, so that the members 6 conform to and rest against the upright ends of the sieve, to which they are secured by staples 7, or by other suitable means. As shown, the wire rests in notches 8 in the ends of the sieve. This is preferred, but is not essential.

Where the sieve is upheld by the supports 1 and 2 in notches 3, the cover D of the box is or may be utilized to confine the supports in the notches, it being fastened down by any suitable means.

Improved means for holding down the cover constitute a special feature of the invention. They may of course be used wherever appropriate. The said means are as follows:

The cover C has on each side a projection, 9, which is notched, for example, in the middle of its upper surface at 10, while the bail E, with which the box is provided, has horizontal portions 11, which, when the bail is vertical, are about on a level with the upper surfaces of said projections, so that they hold down the said cover C. In this position the bail takes into the notches 10, and is prevented from moving except by the application of a suitable de- degree of force. When the bail is turned down, the portions which engage the notches ride over the inclined sides of the notches, and the projections 9 are disengaged, so that the cover C can then be removed. The projections 9, as shown, are so shaped at their edges that when the bail is turned up the portions 11 are pressed upward slightly and spring into the notches 10.

Modifications can be made in details without departing from the spirit of the invention, and parts of the invention may be used separately.

I claim as my invention or discovery—

1. In combination with the box, the reciprocatory sieve provided with a wire extending across and projecting beyond said sieve in the direction of its reciprocation, said wire being bent down in the middle, so as to conform to the upright ends of said sieve, and being fastened to said ends, and the projecting portions of said wire forming supports for upholding the sieve, and one of them forming also a handle for reciprocating the same, substantially as described.

2. The combination, with the box and the bail therefor, of the cover provided with notched projections, the said bail having horizontal portions for overlying and holding down the cover, substantially as described.

3. The sieve provided with a wire bent down in the middle and fastened to the ends of the sieve, the ends of the said wire projecting beyond the sieve on opposite sides, in combination with the box having openings or notches for the passage of the ends of said wire, and the rollers on the outside of said box on which the said ends run, substantially as described.

In testimony whereof I have signed this specification in the presence of two witnesses.

ADDISON F. PUREFOY.

Witnesses:
JULIUS TWISS,
GEORGE L. BARNES.